United States Patent
Shen et al.

(10) Patent No.: US 7,685,410 B2
(45) Date of Patent: Mar. 23, 2010

(54) REDIRECT RECOVERY CACHE THAT RECEIVES BRANCH MISPREDICTION REDIRECTS AND CACHES INSTRUCTIONS TO BE DISPATCHED IN RESPONSE TO THE REDIRECTS

(75) Inventors: Gene W. Shen, San Jose, CA (US); Sean Lie, Santa Clara, CA (US)

(73) Assignee: Global Foundries Inc., Grand Cayman (KY)

( * ) Notice: Subject to any disclaimer, the term of this patent is extended or adjusted under 35 U.S.C. 154(b) by 338 days.

(21) Appl. No.: 11/674,566

(22) Filed: Feb. 13, 2007

(65) Prior Publication Data

US 2008/0195844 A1    Aug. 14, 2008

(51) Int. Cl.
   G06F 7/38    (2006.01)
   G06F 9/00    (2006.01)
   G06F 9/44    (2006.01)
   G06F 15/00   (2006.01)

(52) U.S. Cl. .................................................. 712/237
(58) Field of Classification Search ............... 712/233, 712/237
   See application file for complete search history.

(56) References Cited

U.S. PATENT DOCUMENTS

| | | | |
|---|---|---|---|
| 5,442,760 A | 8/1995 | Rustad et al. | |
| 5,669,011 A | 9/1997 | Alpert et al. | |
| 6,012,125 A | 1/2000 | Tran | |
| 7,003,629 B1 | 2/2006 | Alsup | |
| 7,139,902 B2 | 11/2006 | Lee | |
| 7,143,273 B2 * | 11/2006 | Miller et al. | 712/240 |
| 7,213,126 B1 | 5/2007 | Smaus et al. | |
| 7,219,207 B2 | 5/2007 | Kim et al. | |

* cited by examiner

*Primary Examiner*—Eddie P Chan
*Assistant Examiner*—Corey S Faherty
(74) *Attorney, Agent, or Firm*—Lawrence J. Merkel; Meyertons, Hood, Kivlin, Kowert & Goetzel, P.C.

(57) ABSTRACT

In one embodiment, a processor comprises a branch resolution unit and a redirect recovery cache. The branch resolution unit is configured to detect a mispredicted branch operation, and to transmit a redirect address for fetching instructions from a correct target of the branch operation responsive to detecting the mispredicted branch operation. The redirect recovery cache comprises a plurality of cache entries, each cache entry configured to store operations corresponding to instructions fetched in response to respective mispredicted branch operations. The redirect recovery cache is coupled to receive the redirect address and, if the redirect address is a hit in the redirect recovery cache, the redirect recovery cache is configured to supply operations from the hit cache entry to a pipeline of the processor, bypassing at least one initial pipeline stage.

27 Claims, 4 Drawing Sheets

REDIRECT RECOVERY CACHE THAT RECEIVES BRANCH MISPREDICTION REDIRECTS AND CACHES INSTRUCTIONS TO BE DISPATCHED IN RESPONSE TO THE REDIRECTS

BACKGROUND

1. Field of the Invention

This invention is related to the field of processors and, more particularly, to branch instruction processing in processors.

2. Description of the Related Art

Over time, processors have been produced with increased operating frequencies. Reaching the operating frequencies of modern processors has been accomplished, at least in part, using deeper instruction processing pipelines. Generally, a pipeline is designed by dividing the work to be performed (e.g. instruction processing, in this case) into multiple portions, each of which is assigned to a given pipeline stage. Instructions pass from stage to stage in the pipeline. Pipeline stages can operate on different instructions in parallel, thus overlapping the processing of instructions in time. Deep pipelines have many such stages. For example, pipelines having 10 pipeline stages, 15 pipeline stages, or even more are often found in modern processors. A pipeline having 10 stages can have up to 10 different instructions at various stages of processing. Some stages process more than one instruction at once (e.g. superscalar designs, or fetch stages that fetch multiple instructions at once). Thus, even more instructions can be in the pipeline at various points. Additionally, buffers may be included at various points in the pipeline to buffer instructions, which further increases the number of instructions that can be outstanding in the pipeline.

While the high operating frequencies of deeply pipelined processors can improve overall performance, deep pipelines also present various challenges to a successful design. For example, branch instructions are such a challenge. A branch instruction determines which instructions will be the next to be executed in a given sequence, either those sequential to the branch instruction in memory or those stored at an address specified by the branch instruction or operands of the branch instruction. The branch instruction is executed and the target identified (sequential or non-sequential). The instructions at the target can then be fetched for execution. The branch is referred to as "not taken" if the sequential instructions are the target and "taken" if the non-sequential instructions are the target. Some branch instructions are conditional, in which the taken/not taken result depends on one or more operands. Other branch instructions are unconditional, and always select the non-sequential address.

The execution stages are generally at or near the end of the pipeline, and thus the branch result is not known until late in the pipeline. To fill earlier pipeline stages with instructions, the branch result is typically predicted. If the prediction is correct, the target instructions are already being processed when the branch result is known. If the prediction is incorrect, the wrong instructions are in the pipeline and must be discarded. The instructions from the correct target can then be fetched, but performance has been lost in the interim. For deep pipelines, this performance loss can be especially severe. Accordingly, deep pipeline processors often focus a great deal of design effort and/or hardware on accurately predicting branches. Unfortunately, no prediction mechanism is perfect and, with deep pipelines, even small mispredict rates can result in substantial losses.

SUMMARY

In one embodiment, a processor comprises a branch resolution unit and a redirect recovery cache. The branch resolution unit is configured to detect a mispredicted branch operation, and to transmit a redirect address for fetching instructions from a correct target of the branch operation responsive to detecting the mispredicted branch operation. The redirect recovery cache comprises a plurality of cache entries, each cache entry configured to store operations corresponding to instructions fetched in response to respective mispredicted branch operations. The redirect recovery cache is coupled to receive the redirect address and, if the redirect address is a hit in the redirect recovery cache, the redirect recovery cache is configured to supply operations from the hit cache entry to a pipeline of the processor, bypassing at least one initial pipeline stage.

In another embodiment, a redirect recovery cache comprises a plurality of cache entries and a control unit coupled to the cache entries. Each cache entry is tagged with a redirect address and a corresponding branch history, and is configured to store operations corresponding to instructions fetched in response to respective mispredicted branch operations. The control unit is coupled to receive a redirect address and a redirect branch history for a detected mispredicted branch operation. The control unit is configured to detect a partial hit in a hit cache entry of the plurality of entries if the redirect address matches the tag but the redirect branch history does not match the tag, and to detect a full hit if the redirect address and the redirect branch history matches the tag.

In an embodiment, a method comprises detecting a mispredicted branch operation; transmitting a redirect address to a redirect recovery cache and to a fetch control unit in response to detecting the mispredicted branch operation, wherein the redirect address identifies a correct target of the branch operation; detecting a hit in the redirect recovery cache; and supplying one or more operations from the hit entry of the redirect recovery cache to a processor pipeline, bypassing at least one stage of the pipeline.

In one embodiment, the redirect recovery cache is a secondary source of instruction operations, and the main instruction fetch pipeline is still used the majority of the time. The redirect recovery cache may supply instruction operations to cover one or more early pipeline stages in the event of a redirect (where redirects are likely infrequent because of highly accurate branch prediction mechanisms implemented in the processor). In some embodiments, a relatively small redirect recovery cache may provide significant performance improvements while consuming relatively little power. Similarly, in some embodiments, the redirect recovery cache may be a relatively simple structure. For example, some implementations may not implement branch prediction even though some of the operations stored in the redirect recovery cache may be branches. Generally, the redirect recovery cache may provide the set of instruction operations that would be provided by the main instructions fetch pipeline. In one embodiment, branch predictor hardware in the main instruction fetch pipeline may include branch history as part of the prediction mechanism. In many cases, the same target and branch history may lead to the same prediction. In some embodiments, the redirect recovery cache may store the branch history for the corresponding branch as part of the tag for each cache entry, to help ensure that the operations provided by the redirect recovery cache are the same as those that would be produced by the main instruction fetch pipeline. If both the branch history and redirect target match on a redirect recovery cache lookup, all operations in the hitting entry may be supplied. If the redirect target matches but the branch history does not, the operations in the hitting entry up to the first branch operation may be supplied. In either case, the redirect recovery cache may supply a fetch address to the main instruction fetch pipeline to begin fetching the next instructions following those supplied from the redirect recovery cache, in some embodiments.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
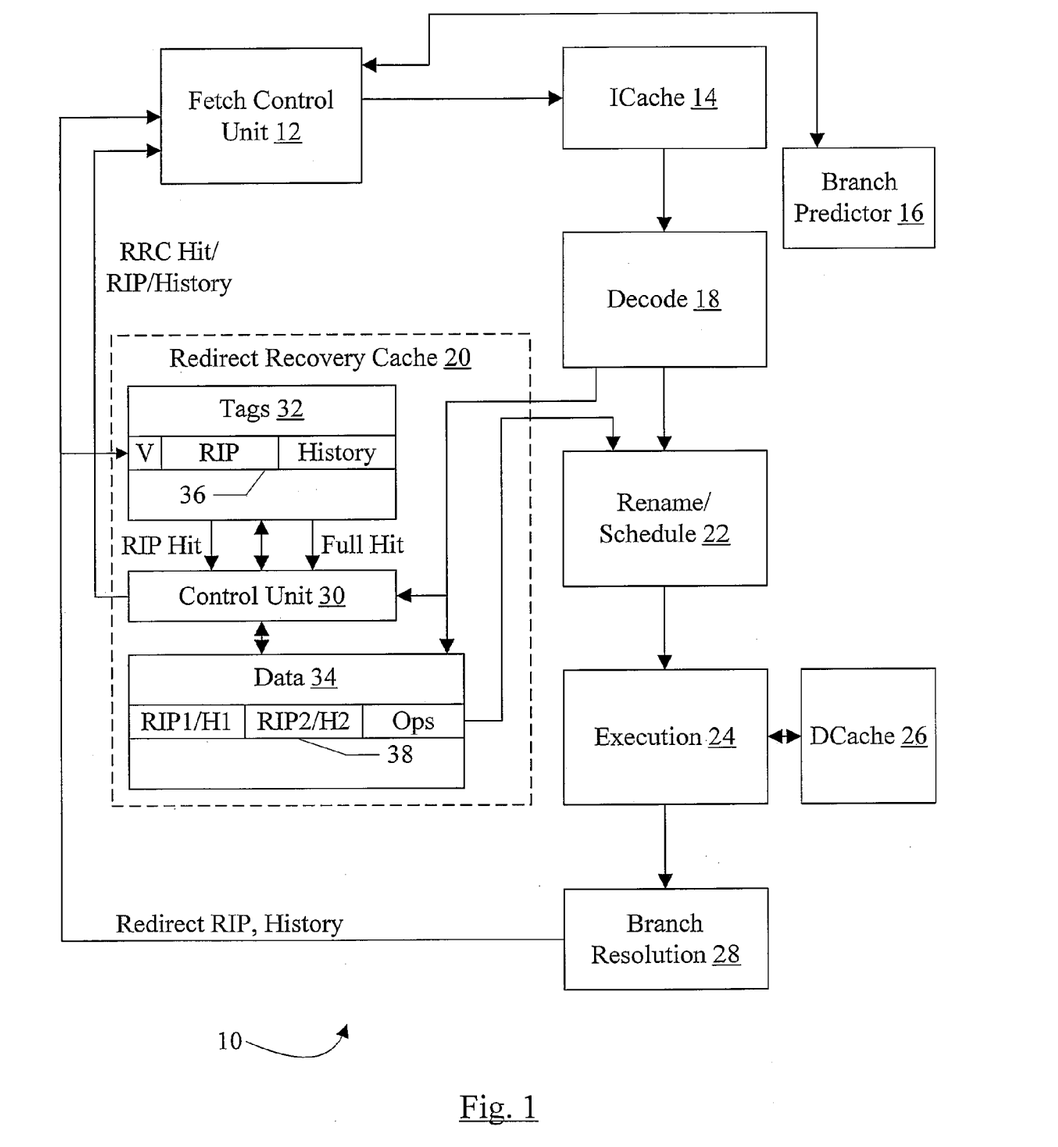
FIG. 1 is a block diagram of one embodiment of a processor including a redirect recovery cache.

Turning now to FIG. 1, a block diagram of one embodiment of a processor 10 is shown. In the illustrated embodiment, the processor 10 comprises a fetch control unit 12, an instruction cache (ICache) 14, a branch predictor 16, a decode unit 18, a redirect recovery cache 20, a rename/schedule unit 22, an execution unit 24, a data cache (DCache) 26, and a branch resolution unit 28. The fetch control unit 12 is coupled to the ICache 14, the branch predictor 16, the branch resolution unit 28, and the redirect recovery cache 20. The ICache 14 is further coupled to the decode unit 18, which is further coupled to the redirect recovery cache 20 and the rename/schedule unit 22. The rename/schedule unit 22 is further is further coupled to the redirect recovery cache 20 and to the execution unit 24. The execution unit 24 is further coupled to the DCache 26 and to the branch resolution unit 28.

In the illustrated embodiment, the redirect recovery cache 20 comprises a cache memory and a control unit 30. The cache memory is shown in two portions in FIG. 1, a tag memory 32 and a data memory 34. Other embodiments may implement a single cache memory storing tag and data, as desired. The tags memory 32 comprises a plurality of tag entries such as exemplary entry 36, and the data memory 34 comprises a plurality of data entries such as exemplary entry 38. Each tag entry corresponds to a different data entry. Together, a tag entry and its data entry form a cache entry. The control unit 30 is coupled to the tags memory 32 and the data memory 34.

The term operation, or instruction operation, (or more briefly "op") will be used herein. Generally, an operation may comprise any operation that execution resources within the processor 10 may execute. Operations may have a one-to-one mapping to instructions specified in an instruction set architecture that is implemented by the processor 10. The operations may be the same as the instructions, or may be in decoded form. Alternatively, instructions in a given instruction set architecture (or at least some of the instructions) may map to two or more operations. In some cases, microcoding may be implemented and the mapping may comprise a microcode routine stored in a microcode read-only memory (ROM). In other cases, hardware may generate the operations, or a combined approach of hardware generation and microcoding may be used. Thus, branch operations correspond to, or are derived from, branch instructions. Similarly, other operations may correspond to, or be derived from, other instructions.

A redirect may generally refer to instructing the fetch unit of a processor to discontinue its current fetch path and to begin fetching at the correct target of a branch operation that has been mispredicted. Thus, the redirect address may be the address to which fetching is to be redirected (the correct target address). In one embodiment, the processor 10 may implement the AMD64™ extensions to the x86 (or IA-32) instruction set architecture, and thus the redirect address is the RIP (the 64 bit instruction pointer). Other instruction set architectures may refer to the instruction pointer as the program counter (PC).

Each cache entry in the redirect recovery cache 20 is configured to store operations corresponding to instructions fetched in response to a previously mispredicted branch operation. If a redirect address hits in the redirect recovery cache, the corresponding cached operations may be inserted into processor 10's pipeline, bypassing at least one early stage in the pipeline. For example, the fetch stage or stages (corresponding to the fetch control unit 12 and the ICache 14) may be bypassed. One or more decode stages (corresponding to the decode unit 18) may also be bypassed. In the illustrated embodiment, pipeline stages corresponding to fetch and decode are bypassed, and instructions are inserted into the rename/schedule unit 22. In this fashion, the penalty (in terms of cycles lost while fetching the correct instructions) for a mispredicted branch may be reduced. Performance may be increased due to the reduction of the branch mispredict penalty, in some embodiments. Additionally, since the penalty for misprediction may be reduced, the accuracy of the branch predictor 16 may be somewhat less critical to performance, and thus branch prediction hardware that would be required to further increase accuracy may be avoided, in some embodiments.

The operations cached by the redirect recovery cache 20 may be in the form that they exist at the pipeline stage in which they will be inserted (e.g. partially or fully decoded form). Alternatively, the redirect recovery cache 20 may comprise logic to modify the cached operations to produce the form they would have at the inserted stage. This logic may be relatively simple logic that does not add clock cycles to the path of inserting operations into the desired pipeline stage.

Figure 3:
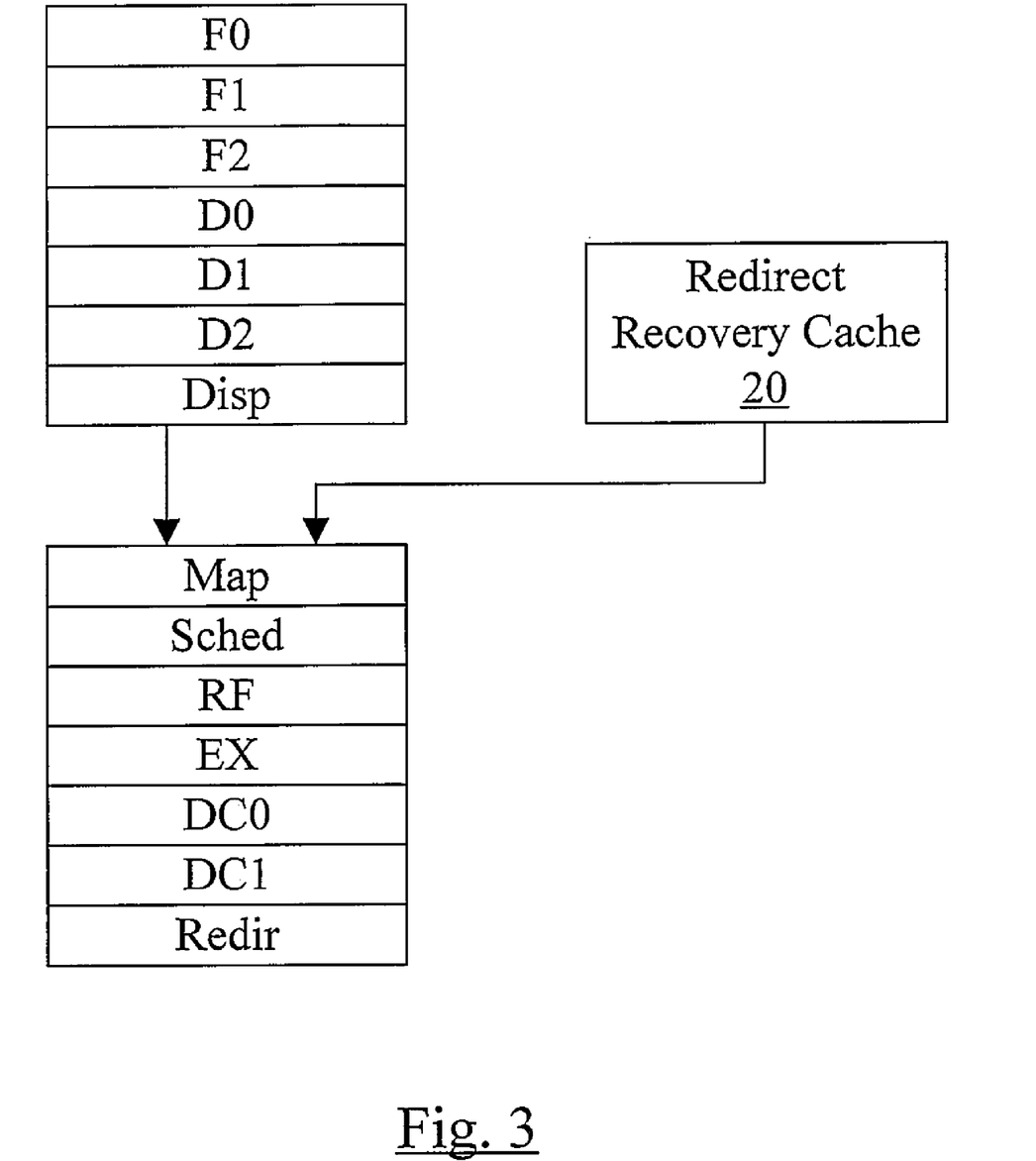
FIG. 3 is a block diagram of one embodiment of a pipeline in a processor.

FIG. 3 is an exemplary pipeline for one embodiment of the processor 10. In other embodiments, the number and arrangement of pipeline stages may vary. In the example, three pipeline stages of fetch (F0, F1, and F2) are included along with three pipeline stages of decode (D1, D1, and D2). A dispatch pipeline stage (Disp) follows the decode stages, which is then followed by a map stage (Map) in which renaming is performed and a schedule stage (Sched) at which operations await operand availability in the scheduler and are scheduled for execution. The schedule stage is followed by a register file read stage (RF), which is followed by an execute (EX) stage and two data cache access stages (DC0 and DC1). The Redirect (Redir) stage follows the data cache stage.

In the exemplary embodiment, the redirect recovery cache 20 inserts operations into the Map stage of the pipeline, bypassing the fetch stages F0, F1, and F2, the decode stages D0, D1, and D2, and the dispatch stage. Accordingly, the branch misprediction penalty may be reduced by 7 clock cycles in this embodiment.

A given cache entry may cache up to a given maximum number of operations. In one embodiment, operations prior to the scheduling stage (at which the operations are conveyed to the execution unit 24 for execution) are maintained in units of up to a maximum number that may be in a given pipeline stage at the same time.

Various events may cause a cache entry to be incompletely filled. For example, various embodiments may have different policies on the number of branch operations that may be cached. For example, an embodiment may allow only "unmarked" branch operations (those that are not predicted by the branch predictor 16, because they have not been previously taken) in the cache entry. Another embodiment may allow only static branch operations, and other embodiments may allow dynamic branch operations. Various embodiments may terminate a cache entry fill for one or more of the following: detection of a microcoded operation; detection of another redirect; detection of a call or return instruction; or an instruction operation that is not codable in redirect recovery cache format. Generally, the events that cause a cache entry to be incompletely filled may be complexity/performance tradeoffs that may vary from implementation to implementation.

The redirect recovery cache 20 may allocate a cache entry in response to detecting a miss for a redirect address, and may cache operations from the processor 10's pipeline that correspond to the instructions fetched from the correct target for the mispredicted branch operation. Thus, the redirect recovery cache 20 may store operations that correspond only to the correct target for mispredicted branch operations. In many applications, a relatively small number of branch operations are "dynamic branches", which are branches that have shown both taken and not taken results (i.e. the dynamic branches have been taken at least once and not taken at least once). In contrast, static branches may be branch operations that have only shown one behavior (e.g. taken). Dynamic branches may be represented in the redirect recovery cache 20 if they have been mispredicted.

The redirect recovery cache 20 tags each cache entry with data that is compared to data provided for a redirect, to detect hit or miss in that cache entry. The entries may be tagged with the redirect address, for example. Thus, a hit in the redirect recovery cache 20 is detected if a given redirect address matches in a tag of a cache entry. In some cases, the entire redirect address may not be stored and thus "tagged with the redirect address" may refer to storing (and comparing) a portion of the redirect address for such embodiments.

Additionally, in some embodiments, the branch history that is associated with the mispredicted branch operation may be included in the tag. For example, if dynamic branches are stored in the redirect recovery cache 20 and the tag branch history matches the redirected branch history, the dynamic branches in the cache entry may frequently be predicted by the branch predictor in the same fashion on the current redirect as they were when the cached redirect occurred. On the other hand, if the branch histories differ, then the dynamic branches may not be predicted the same way. Thus, the cached operations subsequent to the dynamic branches may not be the same as the ones fetched in response to the current redirect.

In one embodiment, two types of cache hits may be detected in the redirect recovery cache. A partial hit may be detected if a redirect address matches in a given tag by the redirect branch history does not match. A full hit may be detected if both the redirect address and the redirect branch history match. As illustrated in FIG. 1, the tags memory 32 may receive the redirect address (redirect RIP) and the corresponding redirect branch history from the branch resolution unit 28. The tags memory 32 may compare the redirect address and branch history to the tags, and signal partial hit or full hit to the control unit 30 (along with an indication of which cache entry was hit). Alternatively, the tags may be read by the control unit 30, which may perform the comparisons.

Exemplary tag entry 36 in the tags memory 32 provides additional detail, for one embodiment. Other embodiments may store additional, substitute, or different data in each tag entry. The tag entry 36 may include a valid bit indicating whether or the entry is valid, an RIP field storing the redirect address to which the entry is allocated, and a history field storing the redirect branch history that was provided by the branch resolution unit 28 for the mispredicted branch operation.

If a full hit is detected, up to the entire cached set of ops may be inserted into the processor 10 pipeline, unless some other event preempts the insertion (e.g. another redirect, an exception, etc.). If a partial hit is detected, the control unit 30 may limit the number of ops inserted. For example, ops may be inserted up to the first dynamic branch in the cached ops. Since the branch prediction may differ for the dynamic branch, those ops after the first dynamic branch may be incorrect for the current redirect.

As mentioned above, a cache entry may be allocated in response to a miss in the redirect recovery cache 20 for a given redirect. In one embodiment, a cache entry may be allocated in response to a partial hit as well. The ops that are provided from the partial hit cache entry into the pipeline may be stored into the newly allocated entry, as well as additional ops that may be provided from fetching subsequent to the first dynamic branch operation.

The data memory 34 may store the ops to be provided in response to a cache hit. Exemplary data entry 38 is shown in FIG. 1. Other embodiments may store additional, substitute, or different data in each data entry. As shown in FIG. 1, the entry 38 includes an ops field (Ops) and two address/history fields (RIP1/H1 and RIP2/H2). The Ops field may store the operations that are in the entry (along with validity data and any other data used to properly insert the ops into the processor 10 pipeline).

One of the address/history fields (e.g. RIP1/H1) may store the address and branch history to be provided to the fetch control unit 12 for a full hit. That is, RIP1/H1 may have the address of the instruction which is subsequent to the instruction that corresponds to the last op stored in the cache entry. The corresponding history may include the effect of any dynamic branch operations in the cache entry. The control unit 30 may provide the RIP1/H1 field to the fetch control unit 12 in response to a full hit. The other address/history field (e.g. RIP2/H2) may include the address and branch history of the next operation after the first dynamic branch operation in the entry. The control unit 30 may provide the RIP2/H2 field to the fetch control unit 12 in response to a partial hit.

In some embodiments, there may be more than two address/history fields. Such an embodiment may permit termination of op insertion at any clock cycle, and directing the fetch control unit 12 to resume fetching at an appropriate instruction.

The control unit 30 may generally control the read/writing of the redirect recovery cache 20, hit detection, etc. Control unit 30 may comprise any circuitry to implement the cache operations. The tags memory 32 and data memory 34 may be formed of any memory (e.g. static random access memory (SRAM) arrays, registers, content addressable memory (CAM), etc.). The tags memory 32 is coupled to receive the redirect address and branch history from the branch resolution unit 28 to detect cache hits and also to store in the event that a new cache entry is allocated by the control unit 30 (e.g. partial hit or miss). The tags memory 32 provides the partial hit and full hit signals to the control unit 30. The data memory 34 is coupled to receive operations from the decode unit 18 for storage and to provide operations to the rename/schedule unit 22 in response to a redirect hit.

The branch resolution unit 28 is configured to resolve branch operations, determining the taken/not taken results for the branch operations and detecting mispredicted branch operations. For example, conditional branches may depend on various condition codes that may be generated by the execution unit 24. The branch resolution unit 28 may receive the condition codes and determine if the condition is met (branch taken) or not met (branch not taken). The branch resolution unit 28 may also determine if the branch operation is mispredicted by comparing the result and the prediction. If the branch operation is mispredicted, the branch resolution unit 28 may transmit the correct target address as the redirect address (redirect RIP), along with the redirect branch history. The redirect address may be provided by the execution unit 24, generated from one or more operands of the operation as defined for the corresponding branch instruction. The branch history may be included from the branch predictor 16 and pipelined with the branch operation, and may be forwarded by the branch resolution unit 28 as the redirect branch history.

The fetch control unit 12 is configured to generate fetch addresses to fetch instructions for execution in the processor 10. The fetch control unit 12 is coupled to the branch predictor 16, and uses the branch predictions generated by the branch predictor 16 to control subsequent fetching. Additionally, redirect addresses from the branch resolution unit 28 and/or the redirect recovery cache 20 may be used to redirect fetching when a branch misprediction occurs. The redirect recovery cache 20 (and more particularly the control unit 30) may transmit a hit (RRC hit in FIG. 1) to the fetch control unit 12. If a hit is asserted, the fetch control unit 12 may select the redirect address and branch history supplied by the redirect recovery cache 20 for fetching. If the redirect recovery cache 20 indicates a miss, the fetch control unit 12 may select the redirect address and branch history supplied by the branch resolution unit 28.

The fetch control unit 12 may provide the selected branch history to the branch predictor 16, to restore the branch predictor 16 history in response to the mispredict. That is, the branch history may be the branch history used by the branch predictor 16 for prediction. The branch predictor 16 may implement any branch prediction mechanism, in various embodiments. Some embodiments of the redirect recovery cache that use the branch history to distinguish between full and partial hits may be used with branch predictors that are history-based and which have the property that a given target and history produces the same set of predictions from the branch predictor 16 for subsequent fetches in the predicted path (as long as the contents of the branch predictor 16 have not been changed).

The decode unit 18 comprises circuitry to decode the instruction bytes fetched from the ICache 14, providing operations to the rename/schedule unit 22. The decode unit 18 may include a microcode unit, if microcoding is implemented. For variable length instruction sets such as the AMD64™ instruction set, decoding may include locating the instructions in the instruction bytes. The decoded operations are provided to the redirect recovery cache 20 as well, for storage if a redirect has been recently detected.

The rename/schedule unit 22 may implement register renaming, and may schedule instructions for execution when their operands are available. Other embodiments may not implement register renaming, if desired. The scheduler may be centralized, or may be distributed (e.g. reservation stations). The rename/scheduler unit 22 may also comprise the register file, which may include storage locations for the physical registers implemented by the processor 10.

Scheduled operations and their operands are provided to the execution unit 24 for execution. The execution unit 24 may represent one or more parallel execution units that execute various operations. For example, various embodiments of the execution unit 24 may comprise one or more integer units, one or more address generation units (for load/store operations), one or more floating point units, and/or one or more multimedia units, etc. Branch operations are also provided to the branch resolution unit 28 for resolution. The execution unit 24 is coupled to the DCache 26 for handling load/store operations.

Each of the ICache 14 and the DCache 26 may comprise any configuration and capacity, in various embodiments. In some embodiments, the ICache 14 may also store predecode data, such as instruction start and/or end indicators to identify the locations of instructions.

The branch history may generally comprise any value which indicates the results of previous branch operations. Branch histories may be local or global. A local branch history is the history of a given branch operation in previous executions, and thus there is a local branch history for each branch operation. A global branch history is the history of previous branch operations in a given sequence of code, and thus various different branch operations may be represented in the history. In one embodiment, the branch history used in the processor 10 is a global branch history.

In one embodiment, the redirect recovery cache 20 may be updated when the contents of the branch predictor 16 are changed. These updates to the redirect recovery cache 20 may be referred to as "pruning", and involve removing instruction operations from a cache entry. For example, as described above, some embodiments of the redirect recovery cache 20 use the branch history to detect a full hit. Such embodiments may rely on the sufficiency of the branch history to identify the set of branch predictions that will be made by the main instruction fetch pipeline, and particularly that the same set of predictions will be made as were made when the cache entry was filled. If the contents of the branch predictor 16 are changed, then the same set of branch predictions many not be made for the same branch history and branch target. In one embodiment, the redirect recovery cache 20 may track branch operations issued from a redirect recovery cache entry. If such a branch operation mispredicts, the mispredicting branch operation and subsequent operations may be pruned from the redirect recovery cache entry.

While the illustrated embodiment inserts operations into the rename/schedule stage 22, other embodiments may be situated at any desired point in the processor 10 pipeline. The closer that the redirect recovery cache insertion point is to dispatch or execution, the more redirect penalty may be absorbed. However, complexity may also increase, in some embodiments. For example, if caching and insertion were performed after renaming is performed, then the rename data would be tracked and reconstructed (since it is dynamic). Similarly, the farther from dispatch that the insertion point is, the less work has been performed on the operations and thus the less information may be cached for each operation, in general.

The redirect recovery cache 20 may have any desired number of entries. A relatively small number of entries may be used (e.g. 64 or 128) and may achieve relatively high hit rates for many applications. However, more or fewer entries may be used in various embodiments. In one embodiment, the redirect recovery cache 20 may be fully associative. However, other embodiments may have other constructions (e.g. set associative, direct mapped, etc.).

In some embodiments, the processor 10 may support multithreading. For example, an embodiment may have shared instruction cache and decode hardware, but may have separate per-thread execution clusters. In such embodiments, a redirect may cause fetching to shift to another active thread (for one of the other execution clusters) while the redirect recovery cache 20 supplies instructions from the mispredicted path into the cluster that detected the redirect. Such an embodiment may effectively fetch simultaneously from two threads during the time that the redirect recovery cache 20 is providing instructions to one cluster while the fetch control unit 12 is fetching for another cluster.

In some embodiments, the redirect recovery cache 20 may implement loop cache functionality. If a loop is detected, the loop may continue dispatching out of the redirect recovery cache 20 until the loop branch is mispredicted. The mispredict (sequential) path for the loop branch may also be stored in the redirect recovery cache 20, further accelerating processing for the loop.

Figure 2:
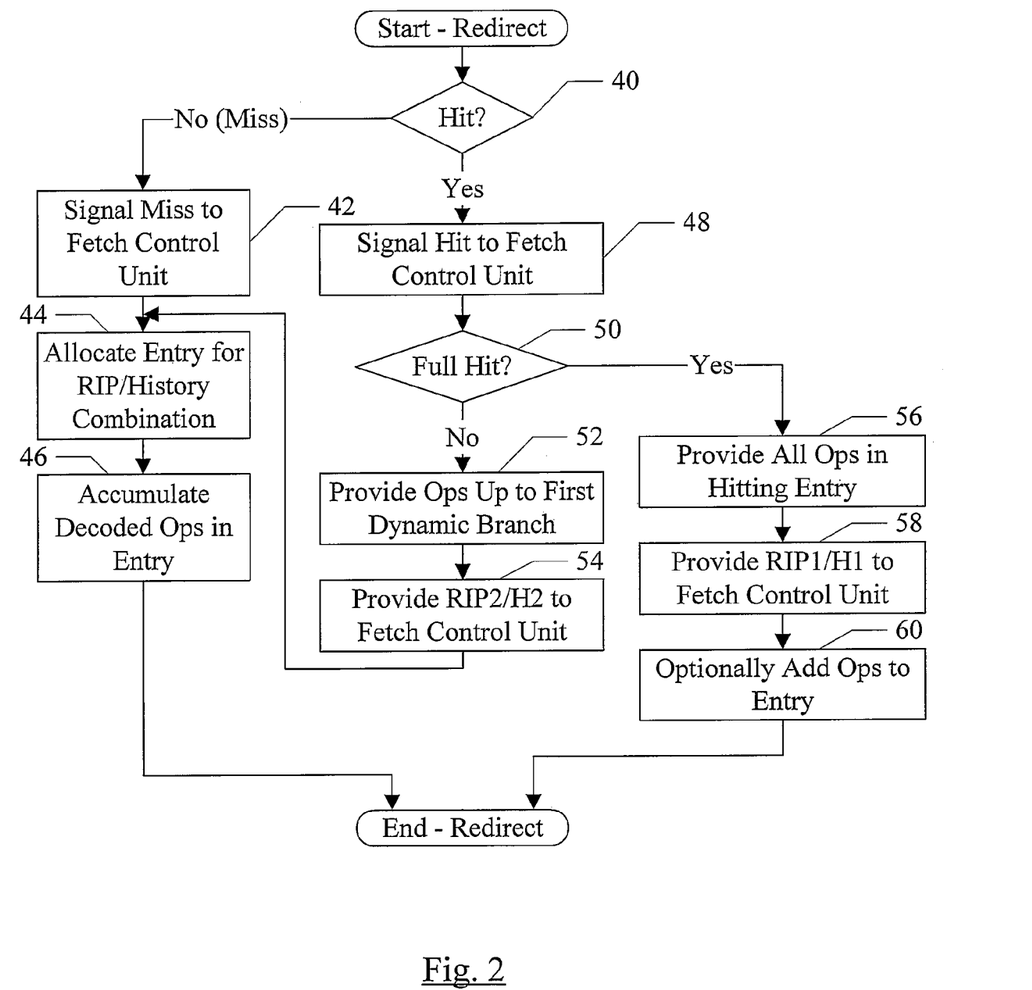
FIG. 2 is a flowchart illustrating operation of one embodiment of portions of the processor shown in FIG. 1.

Turning now to FIG. 2, a flowchart is shown illustrating operation of one embodiment of the redirect recovery cache 20 (and more particularly the control unit 30, in one embodiment) in response to a redirect from the branch resolution unit 28. While the blocks are shown in a particular order for ease of understanding, other orders may be used. Furthermore, blocks may be performed in parallel in combinatorial logic within the redirect recovery cache 20. Blocks, combinations of blocks, and/or the flowchart as a whole may be performed over multiple clock cycles. Particularly, providing ops and filling cache entries may be performed over multiple clock cycles.

The redirect recovery cache 20 may determine if the redirect address from the branch resolution unit 28 is a hit (decision block 40). Both a partial hit and a full hit may be considered hits for this determination. If the redirect address is a miss (decision block 40, "no" leg), the redirect recovery cache 20 may signal a miss to the fetch control unit 12, such as deasserting the RRC hit signal shown in FIG. 1 (block 42). Accordingly, the fetch control unit 12 may fetch from the redirect address provided from the branch resolution unit 28. The redirect recovery cache 20 may also allocate a cache entry for the missing redirect address/branch history combination and may update the tags with the redirect address and branch history (block 44). The redirect recovery cache 20 may accumulate operations in the allocated cache entry as they are provided in the processor pipeline (block 46).

On the other hand, if the redirect address is a hit (decision block 40, "yes" leg), the redirect recovery cache 20 may signal hit to the fetch control unit 12, such as asserting the RRC hit signal (block 48). If the hit is a partial hit (decision block 50, "no" leg), the redirect recovery cache 20 may provide operations from the hitting cache entry up to the first dynamic branch in the entry (block 52) and may provide the address and history from the RIP2/H2 field to the fetch control unit 12 for continued fetching (block 54). Additionally, another cache entry may be allocated and the decoded operations may be accumulated in the newly allocated entry (blocks 44 and 46).

If the hit is a full hit (decision block 50, "yes" leg), the redirect recovery cache 20 may provide all the operations from the hitting cache entry (block 56). Additionally, the redirect recovery cache 20 may provide the address and history from the RIP1/H1 field to the fetch control unit 12 for continued fetching (block 58). Optionally, if the hitting cache entry is not full, the redirect recovery cache 20 may accumulate additional operations in the entry (block 60).

Figure 4:
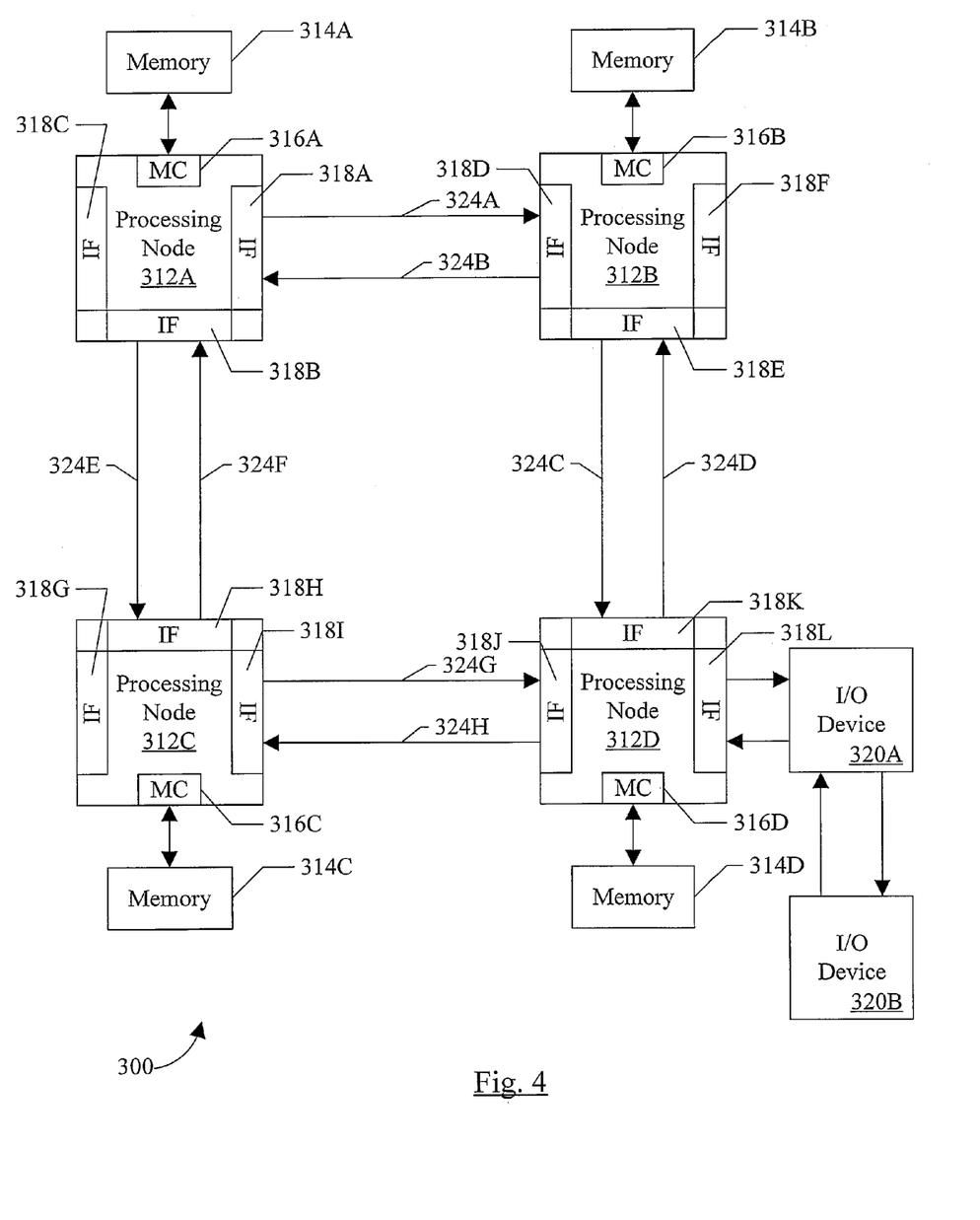
FIG. 4 is a block diagram of one embodiment of a computer system.

Turning now to FIG. 4, an embodiment of a computer system 300 is shown. In the embodiment of FIG. 4, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 4. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 4. Any suitable routing algorithm may be used. Other embodiments of computer system 300 may include more or fewer processing nodes then the embodiment shown in FIG. 4.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various structural and operational details shown in FIGS. 2-3). One or more processors may comprise a chip multiprocessing (CMP) or chip multi-threaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

Numerous variations and modifications will become apparent to those skilled in the art once the above disclosure is fully appreciated. It is intended that the following claims be interpreted to embrace all such variations and modifications.

What is claimed is:

1. A processor comprising:
a branch resolution unit configured to detect a mispredicted branch operation, wherein the branch resolution unit is configured to transmit a redirect address for fetching instructions from a correct target of the branch operation responsive to detecting the mispredicted branch operation;
a redirect recovery cache comprising a plurality of cache entries, each cache entry configured to store operations corresponding to instructions fetched in response to respective mispredicted branch operations, wherein the redirect recovery cache is coupled to receive the redirect address and, responsive to the redirect address hitting in the redirect recovery cache, the redirect recovery cache is configured to supply operations from the hit cache entry to a pipeline of the processor, bypassing at least one initial pipeline stage, and wherein each cache entry is further configured to store at least one address corresponding to an instruction that is subsequent to instructions represented in the cache entry, and wherein the redirect recovery cache is configured to transmit the address from the hit cache entry;
a fetch control unit coupled to receive the address from the hit cache entry; and
an instruction cache coupled to the fetch control unit, wherein the fetch control unit is configured to fetch instructions from the instruction cache, and wherein the fetch control unit is configured to fetch instructions from the address received from the redirect recovery cache in response to the redirect address hitting in the redirect recovery cache.

2. The processor as recited in claim 1 wherein the at least one initial pipeline stage that is bypassed comprises a decode stage.

3. The processor as recited in claim 1 wherein the at least one initial pipeline stage that is bypassed comprises a fetch stage.

4. The processor as recited in claim 1 wherein each cache entry is tagged with the redirect address and a corresponding branch history, and wherein the branch resolution unit is further configured to transmit a redirect branch history with the redirect address, and wherein the redirect recovery cache is configured to detect a partial hit in the hit cache entry if the redirect address matches the tag but the redirect branch history does not match the tag, and wherein the redirect recovery cache is configured to detect a full hit if the redirect address and the redirect branch history matches the tag.

5. The processor as recited in claim 4 wherein the branch history is global.

6. The processor as recited in claim 4 wherein the redirect recovery cache is configured to transmit fewer operations from the hit cache entry in response to a partial hit than in response to a full hit.

7. The processor as recited in claim 6 wherein the redirect recovery cache is configured to transmit operations from the hit cache entry up to a first dynamic branch in the hit entry in response to a partial hit.

8. The processor as recited in claim 7 wherein the redirect recovery cache is configured to transmit each operation from the hit cache entry in response to a full hit.

9. The processor as recited in claim 7 wherein the at least one address in the hit entry comprises a first address of a second instruction that is subsequent to the first dynamic branch and a second address of a second instruction that is subsequent to a last instruction represented in the cache entry, and wherein the redirect recovery cache is configured to transmit the first address from the hit cache entry in response to the partial hit.

10. The processor as recited in claim 9 wherein the redirect recovery cache is configured to transmit the second address from the hit cache entry in response to the full hit.

11. The processor as recited in claim 10 wherein each cache entry is configured to store a first branch history corresponding to the first address and a second branch history corresponding to the second address, and wherein the redirect recovery cache is configured to transmit the first branch history if the first address is transmitted, and wherein the redirect recovery cache is configured to transmit the second branch history if the second address is transmitted.

12. The processor as recited in claim 4 wherein the redirect recovery cache is configured to allocate one of the cache entries in response to a miss of the redirect address in the redirect recovery cache, and wherein the redirect recovery cache is configured to store operations received from the pipeline due to a fetch of the redirect address in the allocated cache entry.

13. The processor as recited in claim 4 wherein the redirect recovery cache is configured to allocate one of the cache entries in response to a partial hit of the redirect address in the redirect recovery cache, and wherein the redirect recovery cache is configured to store operations received from the pipeline due to a fetch of the redirect address in the allocated cache entry.

14. A redirect recovery cache comprising:
a plurality of cache entries, wherein each cache entry is tagged with a redirect address and a corresponding branch history, and wherein each cache entry is configured to store operations corresponding to instructions fetched in response to respective mispredicted branch operations; and
a control unit coupled to the plurality of cache entries and to receive a redirect address and a redirect branch history for a detected mispredicted branch operation, wherein the control unit is configured to detect a partial hit in a hit cache entry of the plurality of entries if the redirect address matches the tag but the redirect branch history does not match the tag, and wherein the control unit is configured to detect a full hit if the redirect address and the redirect branch history matches the tag.

15. The redirect recovery cache as recited in claim 14 wherein the control is configured to transmit fewer operations from the hit cache entry in response to a partial hit than in response to a full hit.

16. The redirect recovery cache as recited in claim 15 wherein the control unit is configured to transmit operations from the hit cache entry up to the first dynamic branch in the hit entry in response to a partial hit.

17. The redirect recovery cache as recited in claim 16 wherein the control unit is configured to transmit each operation from the hit cache entry in response to a full hit.

18. The redirect recovery cache as recited in claim 15 wherein each cache entry is configured to store a first address of a second instruction that is subsequent to the first dynamic branch and a second address of a second instruction that is subsequent to a last instruction represented in the cache entry, and wherein the control unit is configured to transmit the first address from the hit cache entry in response to the partial hit.

19. The redirect recovery cache as recited in claim 18 wherein the control is configured to transmit the second address from the hit cache entry in response to the full hit.

20. A method comprising:
detecting a mispredicted branch operation;
transmitting a redirect address to a redirect recovery cache and to a fetch control unit in response to detecting the mispredicted branch operation, wherein the redirect address identifies a correct target of the branch operation;
transmitting, in response to detecting the mispredicted branch operation, a redirect branch history to the redirect recovery cache with the redirect address;
detecting a full hit in the redirect recovery cache, wherein cache entries in the redirect recovery cache are tagged with a redirect address and a corresponding branch history, and wherein each cache entry stores operations corresponding to instructions fetched in response to respective mispredicted branch operations, and detecting the full hit comprises matching both the redirect address and the redirect branch history in the hit entry;
detecting a partial hit in the redirect recovery cache responsive to matching the redirect address and not matching the redirect branch history in the hit entry; and
supplying one or more operations from the hit entry of the redirect recovery cache to a processor pipeline, bypassing at least one stage of the pipeline, wherein fewer operations are provided in response to detecting the partial hit than are provided in response to detecting the full hit.

21. A processor comprising:
a branch resolution unit configured to detect a mispredicted branch operation, wherein the branch resolution unit is configured to transmit a redirect address for fetching instructions from a correct target of the branch operation responsive to detecting the mispredicted branch operation and to further transmit a redirect branch history corresponding to the redirect address; and
a redirect recovery cache comprising a plurality of cache entries, each cache entry configured to store operations corresponding to instructions fetched in response to respective mispredicted branch operations, wherein the redirect recovery cache is coupled to receive the redirect address and, responsive to the redirect address hitting in the redirect recovery cache, the redirect recovery cache is configured to supply operations from the hit cache entry to a pipeline of the processor, bypassing at least one initial pipeline stage, and wherein each cache entry is tagged with the redirect address and a corresponding branch history, and wherein the redirect recovery cache is configured to detect a partial hit in the hit cache entry responsive to the redirect address matching the tag but the redirect branch history not matching the tag, and wherein the redirect recovery cache is configured to detect a full hit responsive to the redirect address and the redirect branch history matching the tag, and wherein the redirect recovery cache is configured to transmit operations from the hit cache entry up to a first dynamic branch in the hit entry in response to a partial hit.

22. The processor as recited in claim 21 wherein the redirect recovery cache is configured to transmit each operation from the hit cache entry in response to a full hit.

23. The processor as recited in claim 21 wherein each cache entry is configured to store a first address of a second instruction that is subsequent to the first dynamic branch and a second address of a second instruction that is subsequent to a last instruction represented in the cache entry, and wherein the redirect recovery cache is configured to transmit the first address from the hit cache entry in response to the partial hit.

24. The processor as recited in claim 23 wherein the redirect recovery cache is configured to transmit the second address from the hit cache entry in response to the full hit.

25. The processor as recited in claim 24 wherein each cache entry is configured to store a first branch history corresponding to the first address and a second branch history corresponding to the second address, and wherein the redirect recovery cache is configured to transmit the first branch history if the first address is transmitted, and wherein the redirect recovery cache is configured to transmit the second branch history if the second address is transmitted.

26. The processor as recited in claim 21 wherein the redirect recovery cache is configured to allocate one of the cache entries in response to a miss of the redirect address in the redirect recovery cache, and wherein the redirect recovery cache is configured to store operations received from the pipeline due to a fetch of the redirect address in the allocated cache entry.

27. The processor as recited in claim 21 wherein the redirect recovery cache is configured to allocate one of the cache entries in response to a partial hit of the redirect address in the redirect recovery cache, and wherein the redirect recovery cache is configured to store operations received from the pipeline due to a fetch of the redirect address in the allocated cache entry.

* * * * *